L. RAMSEY.
WATER HEATER.
APPLICATION FILED MAY 11, 1912.
1,078,694.
Patented Nov. 18, 1913.
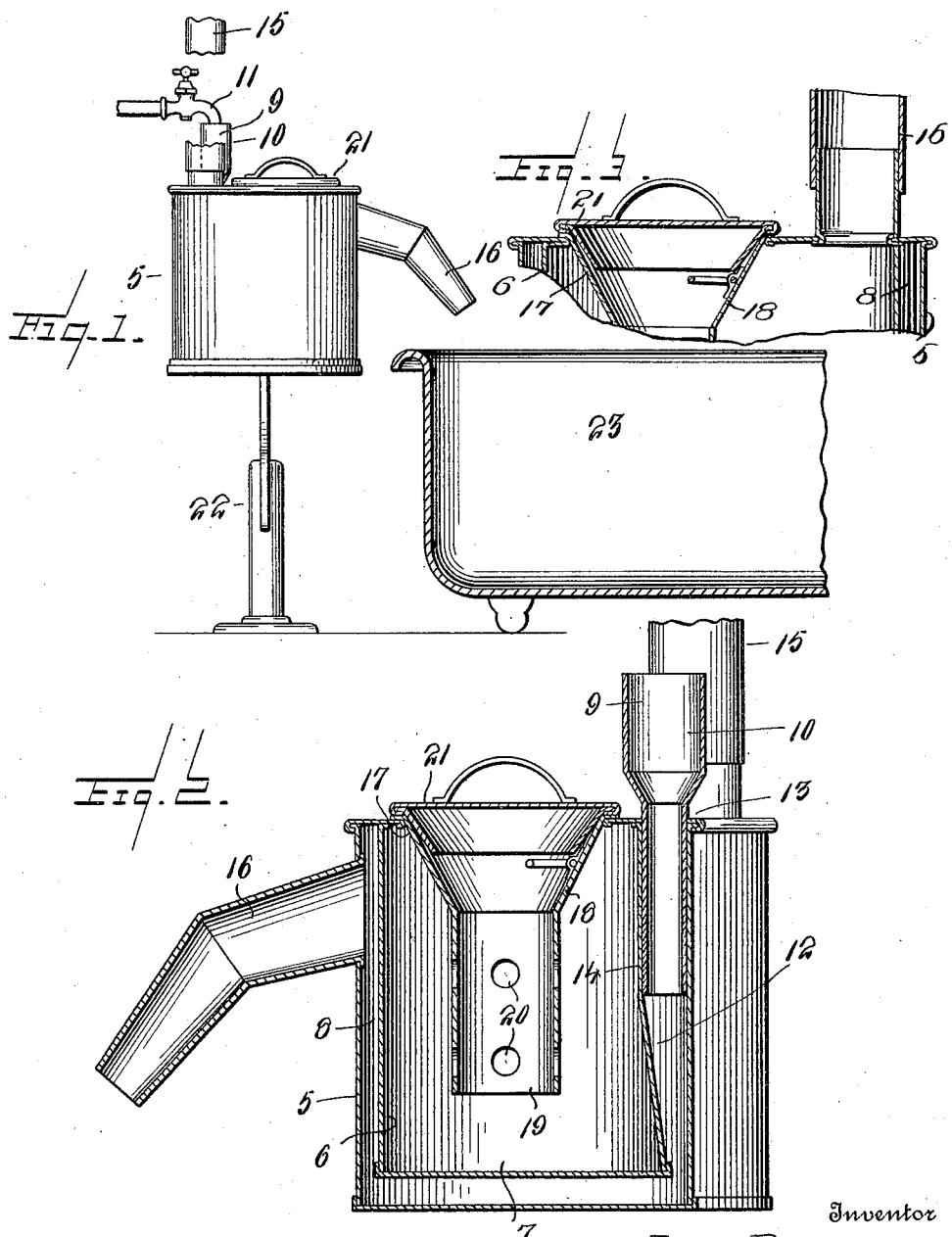
Inventor
Lee Ramsey

UNITED STATES PATENT OFFICE.

LEE RAMSEY, OF COLUMBUS, TEXAS.

WATER-HEATER.

1,078,694.   Specification of Letters Patent.   Patented Nov. 18, 1913.

Application filed May 11, 1912. Serial No. 696,736.

*To all whom it may concern:*

Be it known that I, LEE RAMSEY, a citizen of the United States, residing at Columbus, in the county of Colorado and State of Texas, have invented new and useful Improvements in Water-Heaters, of which the following is a specification.

The invention relates to heaters, and more particularly to the class of portable water heaters.

The primary object of the invention is the provision of a water heater in which a circulation of water may be had, whereby the same may become readily heated for use in a bath tub or other receptacle.

Another object of the invention is the provision of a water heater which may be removably positioned, so as to receive the water supply from an outlet of a water circulating system, whereby the water may become heated to any desired degree for bathing or other purposes, the device being portable to permit its ready and convenient use with bath tubs, sinks, or the like.

A further object of the invention is the provision of a device of this character which is simple in construction, thoroughly reliable and efficient in its purpose, and inexpensive in manufacture.

With these and other objects in view, the invention consists in the construction, combination and arrangement of parts, as will be hereinafter more fully described, illustrated in the accompanying drawings, and pointed out in the claim hereunto appended.

In the drawings: Figure 1 is a fragmentary vertical longitudinal sectional view of a tub and a faucet, showing the invention positioned so as to receive a water supply from a faucet, whereby it may become heated and delivered into the tub. Fig. 2 is an enlarged vertical longitudinal sectional view through the heater. Fig. 3 is a fragmentary vertical sectional view through the device.

Similar reference characters indicate corresponding parts throughout the several views of the drawings.

Referring to the drawings by numerals, the water heater comprises a tank 5, within which is arranged a fire pot 6, the same being of less size than the tank, and is suitably secured to the top thereof, the pot 6 being designed to provide a fire chamber 7, into which fuel is introduced. Between the tank and pot is formed a water chamber 8, with which communicates an inlet tube 9, the same being formed with a funnel shaped upper end 10 of sufficient size to receive the delivery end of a water faucet 11 from a water cistern. This tube 9 slidably fitted in a seat 12 formed in the wall of the pot 6 is adapted to be removably inserted in a suitable aperture 13 formed in the top of the tank 5, the pot 6 being instruck, as at 14, to provide a suitable channel for the inlet tube 9, when inserted through the opening 13 in the top of the tank.

Fixed to and leading from the top of the tank 5, at a suitable point, is a chimney nipple 15, so that the products of combustion within the fire pot 6 may be exhausted therefrom through the said nipple to the atmosphere. Diametrically opposite the chimney nipple 15 and suitably fixed to and projecting outwardly from the tank 5 is a discharge spout 16, through which is discharged the heated water after circulating through the water chamber 8 between the tank and the heater.

Provided in the top of the tank 5 is a draft or feed opening 17, in which is suspended a draft funnel 18, the lower tube end 19 of which is provided with suitable draft apertures 20, and this tube end 19 terminates some distance above the bottom of the pot 6, while the outer end of the funnel is provided with a removable cover 21. On the removal of the cover 21 from the draft funnel 18, fuel may be introduced into the fire chamber 7, which, when ignited, will heat water in the chamber 8 delivered thereto from the inlet tube or pipe 9, prior to the discharge of the water through the outlet spout 16, for consumption, it being understood of course that the products of combustion pass upwardly through the chimney nipple 15 which may or may not be connected with any suitable chimney.

The heater is placed upon any suitable support 22 exterior of the tub 23, so that the inlet tube 9 will be below the faucet 11, whereby on opening the valve of the faucet, water may enter the chamber 8 between the tank 5 and pot 6, and become heated on the burning of the fuel within the fire chamber 7 prior to the discharge of the water through the spout 16 into the tub. During the continued flow of water, the same will circulate in the chamber 8 between the tank 5 and pot 6, and during the burning of the fuel, the said water will be constantly heated, thereby maintaining a uniform temperature.

It is apparent that the heater is readily portable, so that it may be positioned at any desirable locality, either near a sink, bathtub, or other place. Therefore, it will be obvious that the construction of the heater provides for many varied uses thereof.

What is claimed is:

A water heater comprising an outer casing, a fire pot fixed to and depending within the casing from the top thereof to a point spaced from the bottom of the same and being of a size less than the interior diameter of the casing to provide a continuous water space about the side and bottom of the pot, the top of the casing being provided with an aperture communicating with the water space, said pot being provided with a seat, a delivery spout projecting from the casing and communicating with the water space, a filling tube having a contracted portion inserted in the aperture in the top of the casing and slidably engaged in the seat in the wall of said pot and adapted to admit water to the water space, the top of the said casing being further provided with an opening for communication with the tank, a perforated draft member removably inserted through the last-named opening and projected into the pot, an outturned flange formed on the outer end of the draft member and resting upon the top of the casing, and a flue nipple passed through the top of the casing and communicating with the tank.

In testimony whereof I affix my signature in presence of two witnesses.

LEE RAMSEY.

Witnesses:
 LESTER HOLT,
 E. B. MAYES.

Copies of this patent may be obtained for five cents each, by addressing the "Commissioner of Patents, Washington, D. C."